(12) United States Patent
Dogiamis et al.

(10) Patent No.: US 11,990,419 B2
(45) Date of Patent: May 21, 2024

(54) PHYSICALLY UNCLONABLE FUNCTION CIRCUITRY OF A PACKAGE SUBSTRATE AND METHOD OF PROVIDING SAME

(71) Applicant: Intel Corporation, Santa Clara, CA (US)

(72) Inventors: Georgios Dogiamis, Chandler, AZ (US); Feras Eid, Chandler, AZ (US); Adel Elsherbini, Tempe, AZ (US); David Johnston, Hillsboro, OR (US); Jyothi Bhaskarr Velamala, Beaverton, OR (US); Rachael Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 16/905,202

(22) Filed: Jun. 18, 2020

(65) Prior Publication Data

US 2021/0398909 A1 Dec. 23, 2021

(51) Int. Cl.
*H01L 23/544* (2006.01)
*H01L 23/00* (2006.01)
*H01L 23/498* (2006.01)
*H04L 9/32* (2006.01)

(52) U.S. Cl.
CPC ...... *H01L 23/544* (2013.01); *H01L 23/49838* (2013.01); *H01L 24/73* (2013.01); *H04L 9/3278* (2013.01); *H01L 2223/54413* (2013.01); *H01L 2224/73204* (2013.01)

(58) Field of Classification Search
CPC . H01L 23/544; H01L 23/49838; H01L 24/73; H04L 9/3278
See application file for complete search history.

(56) References Cited

U.S. PATENT DOCUMENTS

| | | | |
|---|---|---|---|
| 2010/0019368 A1* | 1/2010 | Shin | H01L 25/0657 257/E23.141 |
| 2018/0122334 A1* | 5/2018 | Coppin | G09G 5/397 |
| 2019/0005275 A1* | 1/2019 | DiMaio | B32B 27/304 |

* cited by examiner

*Primary Examiner* — Michael Jung
(74) *Attorney, Agent, or Firm* — Essential Patents Group, LLP

(57) ABSTRACT

Techniques and mechanisms for providing physically unclonable function (PUF) circuitry at a substrate which supports coupling to an integrated circuit (IC) chip. In an embodiment, the substrate comprises an array of electrodes which extend in a level of metallization at a side of the insulator layer. A cap layer, disposed on the array, is in contact with the electrodes and with a portion of the insulator layer which is between the electrodes. A material of the cap layer has a different composition or microstructure than the metallization. Regions of the cap layer variously provide respective impedances each between a corresponding two electrodes. In other embodiments, the substrate includes (or couples to) integrated circuitry that is operable to determine security information based on the detection of one or more such impedances.

19 Claims, 9 Drawing Sheets

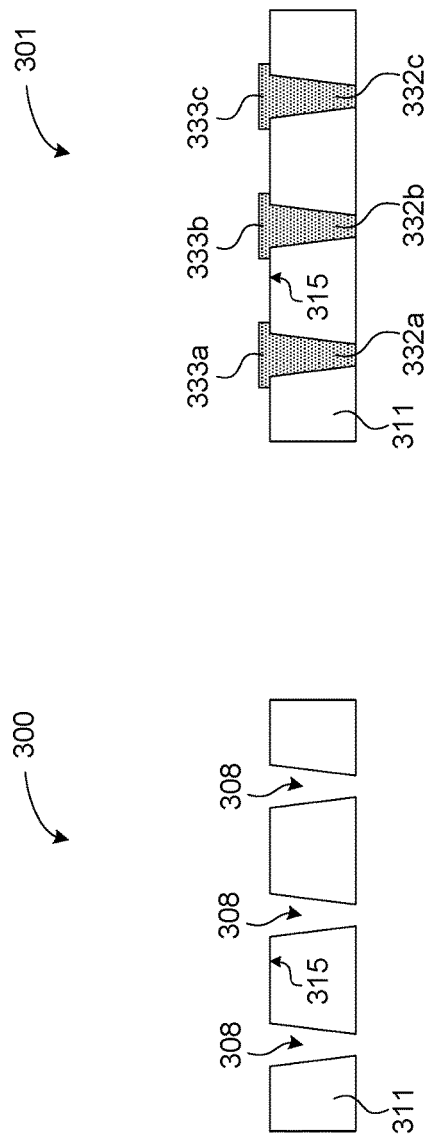
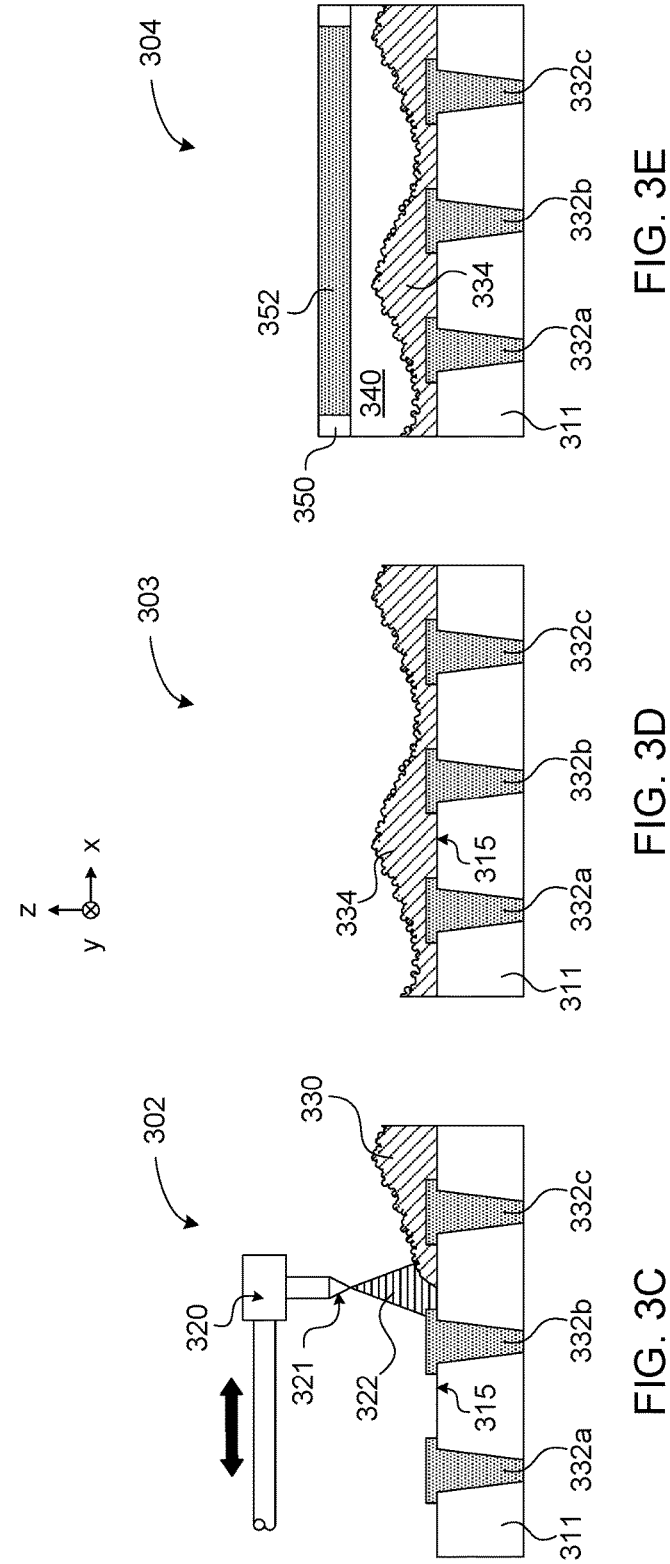

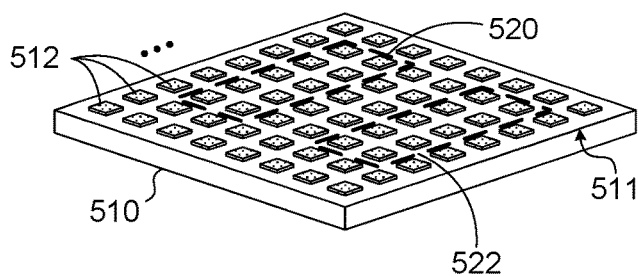
FIG. 5A
FIG. 5B
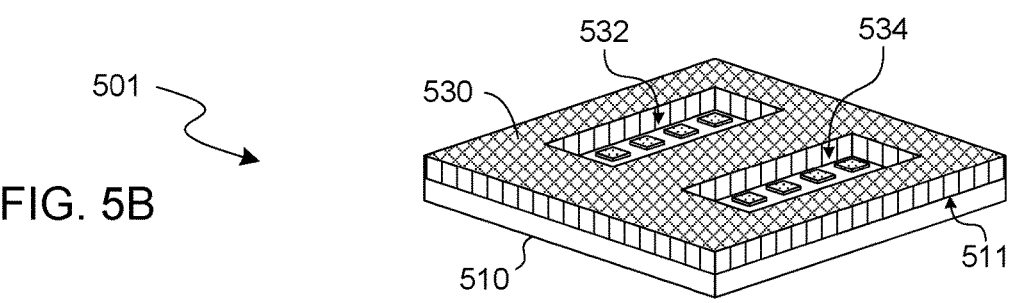
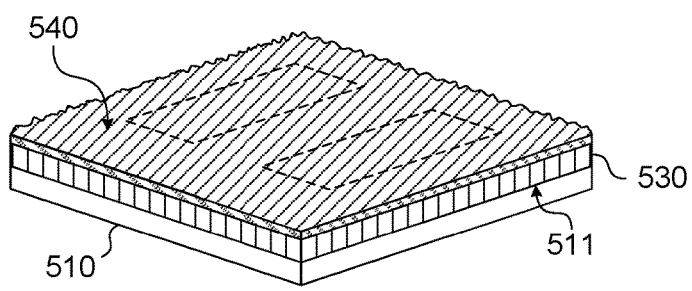
FIG. 5C
FIG. 5D
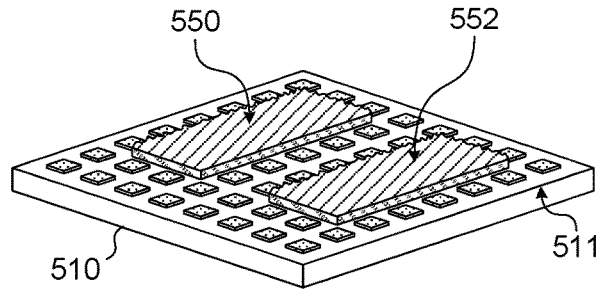

PHYSICALLY UNCLONABLE FUNCTION CIRCUITRY OF A PACKAGE SUBSTRATE AND METHOD OF PROVIDING SAME

BACKGROUND

1. Technical Field

This disclosure generally relates to information security and more particularly, but not exclusively, to physically unclonable function circuitry.

2. Background Art

Many electronic circuits, such as computer chips, use encryption keys to authenticate with another device. The encryption key is sometimes programmed by the manufacturer and stored in fuses on the electronic circuit die. However, the fuses are prone to visual and electrical probing attacks. Furthermore, since the fuses are programmed by the manufacturer, they are vulnerable to an insider attack on the test floor.

Some circuits use a physically unclonable function (PUF) circuit to generate an encryption key. The PUF circuit exploits physical variation in active devices (e.g., transistors) of the PUF circuit to generate the encryption key. It is important that the PUF circuit generates a stable and repeatable encryption key. Furthermore, for high volume manufacturing of PUF circuits, it is beneficial to have high variation between different units of the PUF circuit.

BRIEF DESCRIPTION OF THE DRAWINGS

The various embodiments of the present invention are illustrated by way of example, and not by way of limitation, in the figures of the accompanying drawings and in which:

FIG. 3A-3E illustrates cross-sectional side view diagrams each showing features of a respective stage of processing to provide PUF circuit structures of a substrate according to an embodiment.

FIG. 5A-5D illustrates a perspective view diagram showing features of processing to provide PUF circuit structures according to an embodiment.

DETAILED DESCRIPTION

Figure 1A:
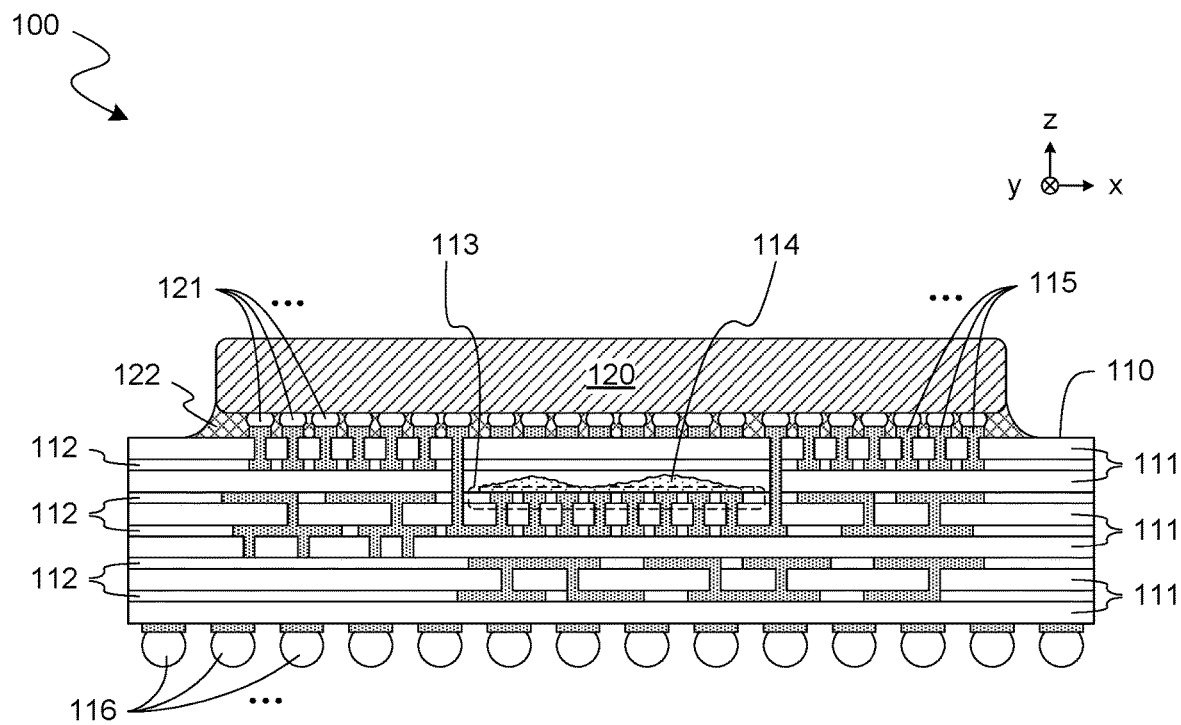
FIG. 1A illustrates a cross-sectional side view diagram showing features of a system to provide physically unclonable function (PUF) circuitry according to an embodiment.

Embodiments discussed herein variously provide techniques and mechanisms for implementing a physically unclonable function (PUF) with a substrate that supports coupling to an integrated circuit (IC) chip. Currently, dedicated areas of integrated circuit (IC) chips are used to provide PUF cells for security purposes. PUF cells in silicon have previously been based on static random-access memory (SRAM) circuits or race circuits, where the relative speed or strength of two circuit elements are put in competition to yield a 1 or 0. While these existing silicon-based approaches are indeed powerful, PUF cells of a given type are usually common on chips on the same lot, and so the possibility of successful reverse-engineering poses a security risk to an entire line of products. For example, an entire CPU line can be vulnerable to hackers that manage to reveal the source of randomness in such PUF cells. Furthermore, there are some design time challenges related to understanding whether or how the behavior of on-chip PUF circuitry might change over time, across a wide range of voltages, and/or at different temperatures.

To help mitigate these disadvantages, some embodiments variously provide PUF circuit structures outside of an IC chip—e.g., where said structures are disposed in or on an organic substrate which is to be coupled to the IC chip. For example, some embodiments variously provide, on an array of conductive contacts, a layer (referred to herein as a "cap layer") comprising one or more materials which are deposited by a high-throughput additive manufacturing (HTAM) process such as a cold spray deposition. A given two conductive contacts (also referred to herein as "electrodes"), in combination with at least a region of the layer, provide a PUF circuit structure that exhibits a particular impedance—e.g., based on a resistance and/or a capacitance of the region.

HTAM enables an efficient formation of randomly varying structures (and correspondingly, randomly varying physical properties) that, along with die circuitry, provide or otherwise facilitate a physical unclonable function. In some embodiments, PUF circuitry enables the detection of an impedance between a given two conductive contacts, where the impedance is due at least in part to a resistance and/or a capacitance in a region of the layer which is formed by such a HTAM process. Such a layer provides highly randomized variation with respect to impedance levels between different respective pairs of conductive contacts.

Some embodiments variously generate a pseudo-random number based on an impedance between a given two conductive contacts of a substrate (other than a substrate of an IC chip, for example). The pseudo-random number provides a basis for determining a cryptographic key, an authentication code and/or other such security information, in some embodiments. Moreover, generation of the same pseudo-random number is repeatable one or more times due to a persistence (over time and/or under various operational conditions) of the impedance characteristics of structures formed by the HTAM processing.

By way of illustration and not limitation, a "binary" evaluation of a resistance and/or a capacitance between two contacts can be performed—e.g., wherein a given impedance level is identified as corresponding to logic high ("1") or logic low ("0") according to whether or not the impedance level is greater than some predetermined reference level of impedance. In one such embodiment, a plurality of such binary evaluations—each corresponding to a different respective pair of conductive contacts—results in multiple single-bit values which (for example) are concatenated or otherwise combined to generate a pseudo-random number.

Alternatively or in addition, a "scalar" evaluation of a resistance and/or a capacitance between two contacts is performed, resulting in a multi-bit value (one in a range of possible values comprising more than two values) which indicates a level of the impedance. In one such embodiment, one or more scalar evaluations—each corresponding to a different respective pair of conductive contacts—results in a corresponding one or more multi-bit values which provide a basis for determining a pseudo-random number. In some embodiments, one such multi-bit value is itself provided as (or is otherwise a basis for determining) the pseudo-random number. Alternatively, a plurality of such multi-bit values are concatenated or otherwise combined to generate a pseudo-random number.

FIG. 1A shows features of a system 100 to provide a physically unclonable function circuit with a substrate according to an embodiment. System 100 illustrates one embodiment wherein a package substrate, for example, comprises an array of conductive contacts (or "electrodes") and a material layer disposed thereon, wherein PUF circuit functionality is facilitated by random physical variations of the material layer. In an embodiment, the material layer facilitates a highly randomized distribution of impedances over the array—e.g., where integrated circuitry coupled to (or alternatively, included in) the substrate detects one or more such impedances, and generates security information based thereon. In some embodiments, system 100 is (or otherwise includes) a packaged semiconductor device.

As shown in FIG. 1A, system 100 includes a substrate 110 and an IC chip 120 coupled thereto. Substrate 110 represents any of various types of substrate for receiving an integrated circuit device, including, but not limited to, a metal core or coreless dielectric or fiberglass based substrate. In some embodiments, conductive contacts 115 comprise metal plated pads connecting to underlying conductive traces to communicatively and/or electrically couple computing components. In some embodiments, contacts 115 are able to bond with solder balls, bondwire, or other solder-based attachments.

In the example embodiment shown, interconnect structures of substrate 110 include metallization layers 112 of patterned conductive traces—e.g., where metallization layers 112 variously extend in parallel with the xy plane of the xyz coordinate system shown. Such metallization structures further include vias (or metal traces) which variously extend vertically (e.g., along the z-axis) to couple respective ones of metallization layers 112 to each other. Metallization layers 112 and said vias—e.g., comprising copper, aluminum, nickel, gold, silver and/or any of various other conductor materials—facilitate electrical connectivity with one or each of two opposite sides of substrate 110. Although five metallization layers 112 are illustrated in FIG. 1, there are more or fewer number of such metallization layers, in alternative embodiments.

Dielectric layers 111 of substrate 110 comprise one or more insulator materials which promote electrical isolation between various traces of metallization layers 112 and/or between various vias. In an embodiment, dielectric layers 111 include any of a variety of dielectric compounds used, for example, in conventional package substrates and/or PCBs. Such compounds include, but are not limited to, polyimide (PI), polytetrafluoroethylene (PTFE), Build-up Film (in general, any of various silica particle filled epoxy materials), a liquid crystal polymer (LCP), and polyetheretherketone (PEEK). In some embodiments, dielectric layers 111 include a laminate material such as FR5, bismaleimide triazine (BT) resin, etc. Substrate 110 has a woven or reinforced core (not shown) or—alternatively—is coreless, in various embodiments.

Metallization layers 112 facilitate signal communication and/or other electrical connectivity between circuit resources which are variously attached, directly or indirectly, each to a respective side of substrate 110. For example, a first hardware interface at a first (die) side of substrate 110 comprises conductive contacts 115 which are variously coupled to respective interconnect structures of metallization layers 112. The first hardware interface facilitates coupling to one or more components including (for example) the illustrative IC chip 120 shown e.g., wherein solder bumps 121 variously provide attachment each to a respective one of contacts 115. An underfill 122 further facilitates coupling of substrate 110 to IC chip 120. The substrate 110 further comprises a second hardware interface at a second (land) side which is opposite the first side. Conductive contacts of the second hardware interface are to be coupled—e.g., via the illustrative solder balls 116 shown—each to a respective conductive contact of a motherboard or other such printed circuit board (not shown) that system 100 includes or, alternatively, is to couple to.

IC chip 120 represents any of various circuit resources which access, provide, or otherwise operate based on security information that is generated, verified or otherwise determined based on physically unclonable function circuitry. By way of illustration and not limitation, unique keys—used for cryptography, authentication and/or other security purposes in information processing—are derived from PUF circuit structures that enable the repeatable generation of a same pseudo-random value based on a variability inherent in the manufacture of substrate 110. In some alternative embodiments, system 100 omits IC chip 120—e.g., wherein an embodiment is implemented entirely with structure of substrate 110.

Some embodiments variously provide such PUF features with circuitry comprising an array of conductive contacts (such as the illustrative array 113 shown), wherein various impedances—e.g., each between a respective two contacts—provide a basis for repeatably generating a pseudo-random value that, in turn, is used for a determining a cryptographic key, an authentication code and/or other such security information. In various embodiments, security information is determined based on the detecting of an impedance between two conductive contacts of array 113. In other embodiments, substrate 110 further comprises a second array of conductive contacts (not shown) which overlaps, and is offset vertically—along the z-axis shown—from array 113. In one such embodiment, security information is additionally or alternatively determined based on the detecting of an impedance between a contact of array 113 and another contact of the second array.

Such impedances are variously provided at least in part by a cap layer 114 which, for example, is formed by a HTAM deposition process. In some embodiments, regions of cap layer 114 (the regions of various respective thicknesses) are rapidly formed, for example, by HTAM cold spray deposition of a powder or multiple powders—e.g., where some or all such powder(s) coalesce into, or otherwise form, a consolidated mass. The HTAM cold spray process forms regions of various respective thicknesses which, in turn, correspond to various impedances each across a different respective one of said regions. A consolidated mass of cap layer 114 is formed by HTAM deposition (through a patterned mask, for example) with one or more stationary or mobile spray nozzles over array 113.

Figure 1B:
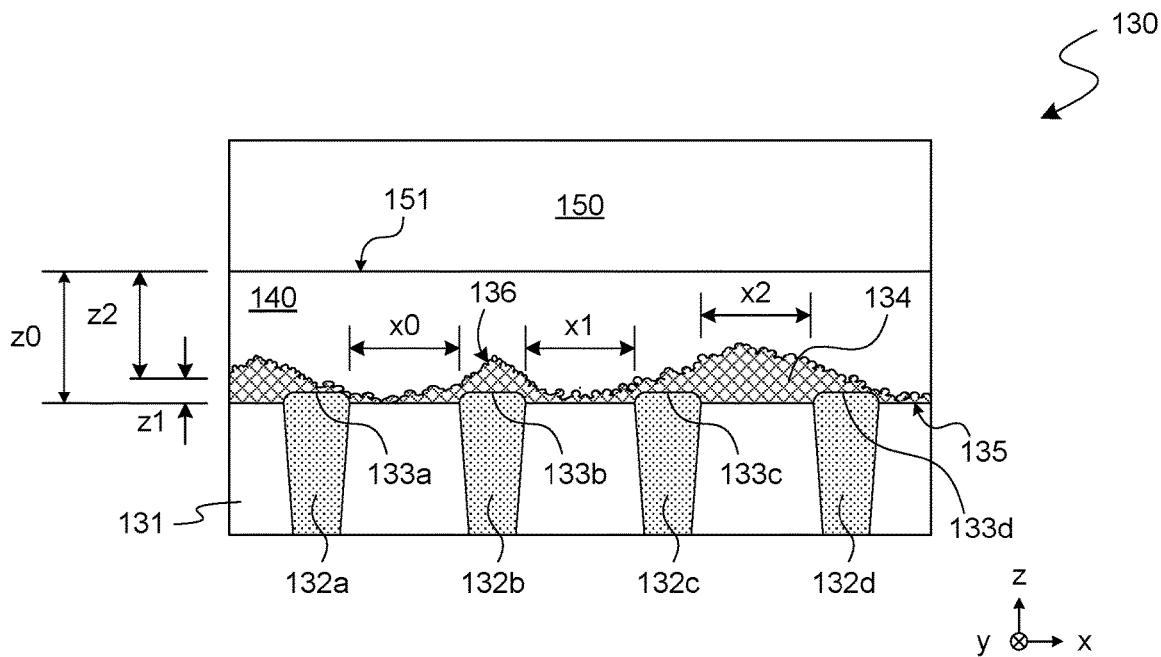
FIGS. 1B-1D illustrate cross-sectional view diagrams each showing features of a respective substrate comprising PUF circuitry according to a corresponding embodiment.

FIG. 1B shows a cross-sectional side view of a substrate 130 comprising PUF circuit structures according to an embodiment. Substrate 130 illustrates one embodiment wherein an array of conductive contacts facilitates the generation of security information based on a random variation of impedances each between a different respective two conductive contacts of said one array. Substrate 130 includes some or all features of substrate 110, in some embodiments.

As shown in FIG. 1B, substrate 130 includes a dielectric layer 131, an array of conductive contacts (including the illustrative contacts 133a-133d shown) at a side 135 of dielectric layer 131, and a layer 134 of one or more materials which are disposed over side 135 and the array. In one such embodiment, dielectric layer 111 and cap layer 114 include (respectively) dielectric layer 131 and layer 134—e.g., wherein array 113 comprises contacts 133a-133d.

Contacts 133a-133d are formed by vias 132a-132d which variously extend each through dielectric layer 131 to a respective metallization structure (not shown) of substrate 130—e.g., to a trace in one of metallization layers 112. In an embodiment, traces, vias and/or other metallization structures of substrate 130 variously interconnect contacts 133a-133d each with a different respective contact of a hardware interface (not shown) by which substrate 130 is to be coupled to an IC chip (such as IC chip 120). For example, one or more additional layers 150 of substrate 130 (e.g., including one or more of metallization layers 112 and/or one or more of dielectric layers 111) variously extend between contacts 133a-133d and the hardware interface.

To facilitate an implementation of PUF features according to various embodiments, substrate 130 further comprises a cap layer 134 which extends over the contacts 133a-133d of the array—e.g., wherein cap layer 134 corresponds functionally to cap layer 114. In some embodiments, cap layer 134 exhibits differences in bulk and/or surface microstructure, as compared (for example) to contacts 133a-133d, to dielectric layer 131, and/or to an adjoining dielectric material 140 which extends over cap layer 134. As an example, a porosity that may be expressed as % voiding area (as measured from a cross sectional micrograph) may be substantially greater in cap layer 134 than in dielectric layer 131 and/or in dielectric material 140. In some embodiments, voiding may be substantially absent in one or both of dielectric layer 131 and dielectric material 140.

In some embodiments, cap layer 134 additionally or alternatively comprises compacted hybrid particles associated with a cold spraying process—e.g., where multiple lamellar domains are built up by particle compaction. In some embodiments, the hybrid structure comprises embedded particles and small lamellar domains of deformed particles—e.g., ranging in size between 1 micron (μm) and 100 μm—comprising stacks of compressed and distended particles. As a result, the supplemental material may have voids that may be 0.1% to 0.5% of the cross-sectional area (e.g., as measured by scanning electron microscopy). The existence of voids, particularly within the bulk of cap layer 134, is indicative that features of cap layer 134 have been formed by a HTAM process, such as spray deposition (e.g., a cold spray process). Voiding area is generally a well-characterized quality control parameter that can be monitored in spray deposition processes. Hence, a non-zero voiding within features of cap layer 134, coupled with dielectric layer 131 and/or dielectric material 140 having a much lower voiding area (e.g., substantially zero) is indicative of PUF circuit structures in accordance with some embodiments herein. As a further indication of HTAM-produced custom features, a roughness of a surface 136 of cap layer 134 may be substantially greater than that of dielectric layer 131, that of contacts 133a-133d and/or that of dielectric material 140—e.g., resulting in large voids occurring within cap layer 134 at an interface with side 135.

In some embodiments, cap layer 134 additionally or alternatively has a composition that is substantially different from that of an adjoining conductive contact and/or an adjoining dielectric material. As an example, contacts 133a-133d may comprise bulk copper (e.g., having substantially zero voiding)—e.g., wherein cap layer 134 comprises a composite of copper (and/or a different metal) and a dielectric material, such as silicon dioxide ($SiO_2$).

By employment of a HTAM process such as cold spraying, PUF solutions may be produced with cap layer 134 to facilitate a repeatable determining of one or more cryptographic keys, authentication codes and/or other such security information. By way of illustration and not limitation, cap layer 134 is formed by a cold spray deposition of microscopic beads and/or other such particles, resulting in a thickness z1 of layer 134 which varies along a horizontal distance (e.g., in an x-y plane of the xyz coordinate system shown). By contrast, a relatively more consistent distance z0, between side 135 and a closest side 151 of the one or more additional layers 150, is comprised of thickness z1 and a conversely varying thickness z2 of dielectric material 140.

In an illustrative scenario according to one embodiment, cap layer 134 comprises a conductive material—e.g., wherein the thickness z1 (and/or a density of distribution of conductive particles of cap layer 134) is greater over the region x2 between contacts 133c, 133d, than it is over the region x1 between contacts 133b, 133c, or over the region x0 between contacts 133a, 133b. As a result, a resistance between contacts 133c, 133d is (for example) lower than a resistance between contacts 133b, 133c, and is also lower than another resistance between contacts 133a, 133b. Such varying levels of resistance, resulting from random variations in the formation of layer 134, provide a basis for PUF circuit features to be provided according to some embodiments.

In certain embodiments, cap layer 134 additionally or alternatively comprises a dielectric material which, as compared to that of dielectric layer 131 and/or that of dielectric material 140, has a relatively high permittivity. In one such embodiment—due to the variation of thickness z1 (and/or a variation of a distribution of particles) across regions x0, x1, x2—a capacitance between contacts 133c, 133d is (for example) higher than a capacitance between contacts 133b, 133c, and is also higher than another capacitance between contacts 133a, 133b. Such varying levels of capacitance provide an additional or alternative basis for PUF circuit features to be provided according to some embodiments.

In the cross-section that is shown, cap layer 134 is not necessarily of a consistent material composition across one or more regions (e.g., across region x0 and/or across region x1). For example, it is to be appreciated that, in some embodiments, a conductive path between contacts 132a, 132b is prevented by one or more gaps that are formed by cap layer 134 in region x0, and/or is prevented by the location of one more dielectric particles of cap layer 134 in region x0. Alternatively or in addition, a conductive path between contacts 132b, 132c (for example) is prevented by one or more gaps that are formed by cap layer 134 in region x1, and/or is prevented by the location of one more dielectric particles of cap layer 134 in region x1. By contrast, any gaps and/or dielectric particles in region x2 fail to prevent the formation of a conductive path between contacts 132c, 132d (for example).

Figure 1C:
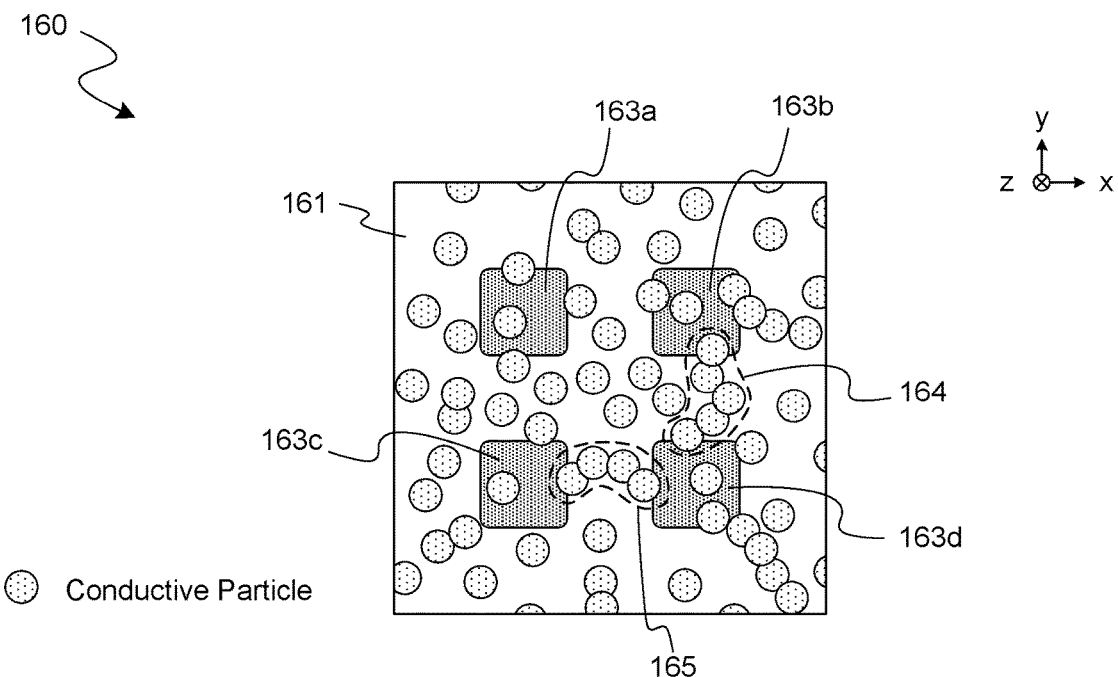

FIG. 1C shows a cross-sectional top view of a substrate 160 comprising PUF circuitry according to another embodiment. Substrate 160 illustrates one embodiment wherein PUF features are provided with conductive particles of a cap layer which facilitates a randomization of impedance levels between respective contacts of an array. Substrate 160 includes features of one of substrates 110, 130, for example. In other embodiments, such randomization of impedance levels is additionally or alternatively provided with dielectric particles of such a cap layer—e.g., wherein the cap layer comprises only dielectric particles or (alternatively) a mixture of conductive particles and dielectric particles.

As shown in FIG. 1C, substrate 160 includes a dielectric layer 161, where a level of metallization of substrate 160 comprises an array of conductive contacts at a side of dielectric layer 161. For example, the level of metallization extends in an x-y plane of the xyz coordinate system shown, where dielectric layer 161 corresponds functionally to dielectric layer 131, and where the illustrative contacts 163a-163d of the array correspond functionally to contacts 133a-133d.

A cap layer of substrate 160 comprises discrete particles of an electrically conductive material, only some of which are shown in FIG. 1C. Although some embodiments are not limited in this regard, the cap layer is further formed from second particles (not shown) which, for example, comprise a dielectric material. In one such embodiment, the second particles, in combination with conductive particles such as those shown, promote a randomness with respect to various impedance levels each between a different respective two contacts of the array.

As shown in FIG. 1C, various ones of the conductive particles are each in contact with a respective one of contacts 163a-163d. Furthermore, various ones of the conductive particles each extend at least in part over a respective region between a given two of contacts 163a-163d—e.g., wherein said conductive particles each extend over an edge of one of the contacts. As more conductive particles are deposited on dielectric layer 161—e.g., in the course of a cold spray or other HTAM process to form one of cap layers 114, 134—it becomes increasingly likely that a conductive path will be formed between a given two of contacts 163a-163d. For example, conductive particles of the cap layer form a cluster 164 which electrically couples contacts 163b, 163d with each other. Additionally or alternatively, other conductive particles of the cap layer form a cluster 165 which electrically couples contacts 163c, 163d with each other. As a result, the cap layer provides an impedance between contacts 163a, 163b (as well as another impedance between contacts 163a, 163c) which is relatively high, as compared to an impedance between contacts 163b, 163c, and as compared to an impedance between contacts 163b, 163d Some embodiments promote a randomness in the various levels of impedances between contacts 163a-163d by controlling one or more factors of an HTAM process which forms the cap layer on dielectric layer 161. By way of illustration and not limitation, such factors include one or more materials to be deposited (and their respective electrical properties), a relative ratio of different materials to be deposited, a size of particles to be deposited, an overall thickness of cap layer material, and/or the like. Some or all of these factors are determined, for example, based on an average cross-sectional area of contacts 163a-163d, an average distance between an adjacent two of contacts 163a-163d, and/or the like.

Figure 1D:
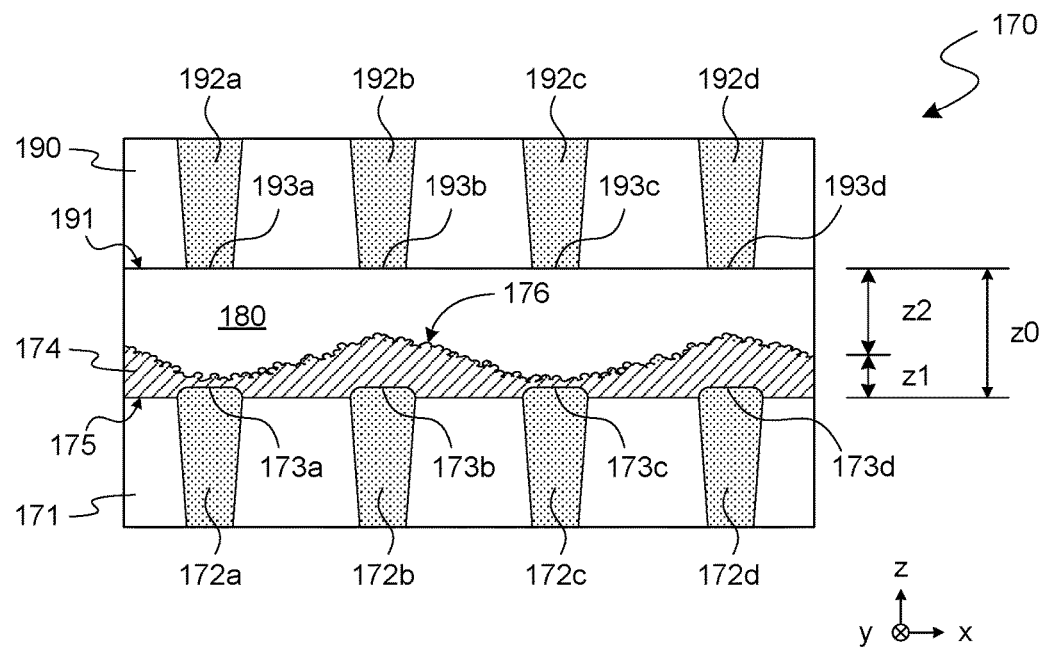

FIG. 1D shows a cross-sectional side view of a substrate 170 comprising PUF circuitry according to another embodiment. Substrate 170 illustrates one embodiment wherein PUF features are provided with two arrays of conductive contacts, and with a cap layer—extending between said arrays—which facilitates a randomization with respect to various impedance levels between the arrays. Substrate 170 includes features of one of substrates 110, 130, 160, for example.

As shown in FIG. 1D, substrate 170 includes a dielectric layer 171, where a first array of conductive contacts (e.g., including the illustrative contacts 173a-173d shown) is in a first level of metallization at a side 175 of dielectric layer 171. Contacts 173a-173d are formed by vias 172a-172d which variously extend each through dielectric layer 171 to a respective trace and/or other metallization structure (not shown) of substrate 170. Substrate 170 further comprises another dielectric layer 190 a second array of conductive contacts (e.g., including the illustrative contacts 193a-193d shown) which is in a second level of metallization at a side 191 of dielectric layer 190. Contacts 193a-193d are formed by vias 192a-192d which variously extend each through dielectric layer 109 to a respective metallization structure (not shown) of substrate 170. In one such embodiment, traces, vias and/or other metallization structures of substrate 170 variously interconnect contacts 173a-173d and contacts 193a-193d each with a different respective contact of a hardware interface (not shown) by which substrate 170 is to be coupled to an IC chip.

A cap layer 174 of substrate 170 is disposed between sides 175, 191 and between the two arrays—e.g., wherein cap layer 174 corresponds functionally to one of cap layers 114, 134. In some embodiments, cap layer 174 includes one or more artefacts of a cold spray (or other HTAM) process. For example, a roughness of a surface 176 of cap layer 174 may be substantially greater than that of dielectric layer 171, that of contacts 173a-173d and/or that of an adjoining dielectric material 180 which extends over cap layer 174—e.g., resulting in large voids occurring within cap layer 174 at an interface with side 175. In some embodiments, cap layer 174 additionally or alternatively exhibits differences in bulk and/or surface microstructure, as compared (for example) to contacts 173a-173d, to dielectric layer 171, and/or to dielectric material 180. In one such embodiment, a % voiding area is substantially greater in cap layer 174 than in dielectric layer 171 and/or in dielectric material 180. In some embodiments, cap layer 174 additionally or alternatively comprises compacted hybrid particles associated with a cold spraying process.

To provide PUF circuit features according to various embodiments, a thickness z1 of cap layer 174 varies along a horizontal distance (e.g., in an x-y plane of the xyz coordinate system shown). By contrast, a relatively more consistent distance z0, between side 175 and a closest side 191 of dielectric layer 190, is comprised of thickness z1 and a conversely varying thickness z2 of dielectric material 180.

In an illustrative scenario according to one embodiment, cap layer 174 comprises a dielectric that has a relatively high permittivity, as compared to that of dielectric material 180—e.g., wherein the thickness z1 is greater between contacts 173b, 193b, than it is between contacts 173a, 193a, or between contacts 173c, 193c. Furthermore, the thickness z1 is greater between contacts 173d, 193d, than it is between contacts 173a, 193a, or between contacts 173c, 193c. As a result, a capacitance between contacts 173b, 193b is (for example) greater than a capacitance between contacts 173a, 193a, and is also greater than another capacitance between contacts 173c, 193c. Furthermore, a capacitance between contacts 173d, 193d is greater than the capacitance between contacts 173a, 193a, and is also greater than the capacitance between contacts 173c, 193c. Such variation with respect to levels of capacitance between the arrays provides a basis for PUF circuit features to be provided according to some embodiments.

Figure 2:
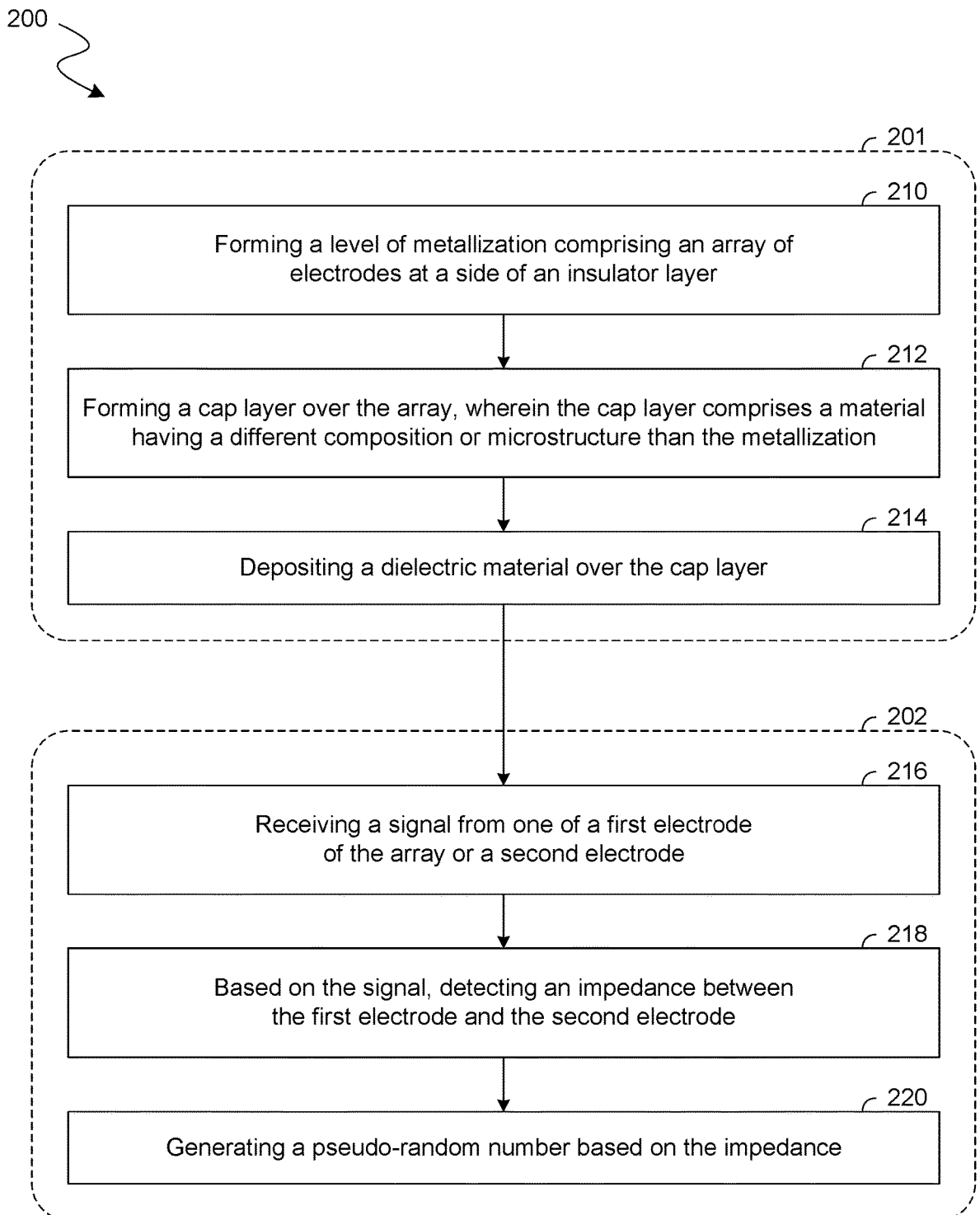
FIG. 2 illustrates a flow diagram showing features of a method for providing PUF circuit structures with a substrate according to an embodiment.

FIG. 2 shows features of a method 200 to provide PUF circuitry according to an embodiment. Method 200 illustrates one embodiment wherein fabrication of a package substrate facilitates a randomization of impedance levels between conductive contacts of one or more arrays. In various embodiments, method 200 provides functionality of one of substrates 110, 130, 160, 170, for example.

In various embodiments, method 200 comprises operations 201 to form PUF structures of a substrate (e.g., an IC package substrate) such as one of substrates 110, 130, 160, 170. Operations 201 comprise (at 210) forming a level of metallization comprising an array of electrodes at a side of an insulator layer. The insulator layer is at an exterior side of the substrate or, alternatively, is a layer on which one or more other layers of the substrate are to be subsequently formed. In an example embodiment, the forming at 210 comprises electroplating and/or any of various other metallization processes to deposit a conductor of array 113.

Operations 201 further comprise (at 212) forming a cap layer—e.g., one of cap layers 114, 134, 174—over the array, wherein the cap layer comprises a material having a different composition or microstructure than the metallization formed at 210. After the forming at 212, the cap layer is in contact with individual ones of the electrodes and, furthermore, in contact with at least a portion of the insulator layer which is between adjacent ones of the electrodes. In various embodiments, some metallization structures of the substrate extend to a first portion of the side of the insulator layer, wherein the first portion is outside of a horizontal (xy-plane) span of the cap layer.

In some embodiments, the forming at 212 comprises a cold spray deposition of a powder (or powder mixture) which, for example, includes particles of a conductive material and/or particles of a dielectric material. For example, in some embodiments, the material is a first material which forms first microstructures of the cap layer. In one such embodiment, second microstructures formed by the cap layer are each located between respective ones of the first microstructures, wherein the second microstructures each comprise a respective void or a second material other than the first material.

In some embodiments, the cap layer comprises discrete particles of an electrically conductive material, wherein a first of the particles is in contact with, and extends beyond an edge of, a first electrode, and a second of the particles is in contact with, and extends beyond an edge of, a second electrode which is adjacent to the first electrode. In some embodiments, the first of the particles is not in contact with the second electrode—e.g., wherein the first and second electrodes are not electrically shorted together by the cap layer. For example, the first particle and the second particle each have a respective size which is less than a spacing between first and second electrodes.

Operations 201 further comprise (at 214) depositing over the cap layer a dielectric material—e.g., one of dielectric materials 140, 180—which, for example, is to provide electrical insulation between the cap layer and one or more metallization structures which are to be subsequently formed over the array. In one such embodiment, the cap layer (relative to the metallization or the dielectric material) has a least one of a greater surface roughness, or a greater % voiding area.

Although some embodiments are not limited in this regard, operations 201 may further comprise additional processes (not shown) which, for example, provide additional metallization structures of the substrate. In one example embodiment, the level of metallization is a first level of metallization and the array is a first array of first electrodes, wherein such additional processes comprise forming a second level of metallization (e.g., at side 191) over the first level of metallization. The PUF structures further comprise a second array of second electrodes in the second level of metallization—e.g., wherein the second array overlaps the first array and wherein the cap layer is between the first and second electrodes. Additionally or alternatively, other processes of operations 201 comprise forming an additional level of metallization over or under the first level of metallization, where the additional level comprises a contiguous sheet of metallization having an area at least equal to that of the array. In some embodiments, the contiguous sheet (comprising tungsten, for example) provides at least partial protection from X-ray and/or other analysis of the PUF structures.

In some embodiments, method 200 additionally or alternatively comprises operations 202 to provide security information with integrated circuitry which is embedded in (or alternatively, which is coupled to) the substrate. The security information is generated based on impedance characteristics of PUF structures such as those resulting from operations 201. In one such embodiment, operations 202 comprise (at 216) receiving a signal from one of a first electrode of the array, or a second electrode which, for example, is another electrode of the array (or alternatively, of a different array of electrodes). Based on the signal received at 216, operations 202 further detect (at 218) an impedance between the first electrode and the second electrode. Based on the impedance detected at 216, operations 202 further generate (at 220) a pseudo-random number that is to be a basis for security information such as a cryptographic key, an authentication code, or the like.

FIGS. 3A-3E shows respective stages 300-304 of processing to fabricate a substrate comprising a PUF circuit according to an embodiment. Processing such as that illustrated by stages 300-304 performs some or all of method 200, for example. In various embodiments, such processing provides structural features of one of substrates 110, 130, 160, 170.

As illustrated by the cross-sectional view in FIG. 3A, stage 300 includes lamination and patterning of a build-up dielectric layer 311—e.g., an interior one or, alternatively, a surface one of dielectric layers 111 in FIG. 1A. Dielectric layer 311 is deposited over a patterned metal layer (not shown) of the substrate. Generally, the patterned metal layer, and any number of layers below the patterned metal layer, are formed using operations adapted (for example) from any of various techniques known in the art. The dielectric layer 311 is, for example, any of various suitable compositions known in the art and/or is applied over the patterned sub-surface level metal layer in any of various conventional manners. At stage 300, a side 315 of dielectric layer 311 is etched, laser drilled or otherwise patterned, forming holes 308 where vias and/or other interconnect structures are to be formed.

For example, in FIG. 3B a cross-sectional view of stage 301 illustrates vias 332a-332c which are formed by one or more metallization processes. By way of illustration and not limitation, a seed layer is deposited on side 315 and into holes 308 by vapor deposition (e.g., sputtering) or any of various electroless plating processes, for example. Subsequently, an electrolytic plating process (e.g., copper plating) is performed to deposit a fill metal on the seed layer. In some embodiments, formation of vias 332a-332c further comprises mask, etch, chemical-mechanical polishing, and/or other processes which, for example, are adapted from conventional fabrication techniques.

Vias 332a-332c variously form contacts 333a-333c of an array such as array 113—e.g., wherein PUF features are to be provided with the array. In one such embodiment, various levels of impedance—each between a respective two contacts of the array—are provided with a sprayed material, where variations in the composition and/or microstructure of the material facilitate PUF circuit features. For example, the cross-sectional view of stage 302 in FIG. 3C illustrates a HTAM process wherein a dispenser 320 moves, relative to side 315, while a spray 322 of particles is emitted from a nozzle 321 of dispenser 320 and onto side 315. Such spraying variously deposits a HTAM material 330 at various levels of particle concentration (e.g., including various levels of thickness) in regions over and between contacts 332a-332c.

The HTAM process at stage 302 comprises, for example, a cold spray deposition of one or more solid powders, each of a suitable material (or material mixture). Cold spray deposition of HTAM material 330 protects other structure of the substrate from high temperatures, and (for example) avoids the need for some lithographic processes—e.g., including resist deposition, exposure, resist development, and resist removal—that might otherwise be performed. In one such embodiment, particles of spray 322 comprise a conductive material such as copper (Cu), aluminum (Al), solder and/or any of various other suitable metals (or alloys thereof). The particles of spray 322 may additionally or alternatively comprise a dielectric material, such as any of various polymer resins, PEEK, PTFE, low-temperature cofired ceramic (LTCC), or $SiO_2$, for example. In one such embodiment, spray 322 is accelerated in a jet of a compressed carrier gas, such as air or nitrogen ($N_2$)—e.g., where nozzle 321 is a converging diverging nozzle. The impact of spray 322 on side 315 causes jet particles to plastically deform and bond to dielectric layer 311 and/or to previously deposited portions of HTAM material 330.

For example, as illustrated by the cross-sectional view of stage 303 in FIG. 3D, a cap layer 334 comprising the HTAM material 340 if formed over side 315. For example, lateral roughness of spray 322, and its impact on side 315, contribute to a variation of thicknesses of layer 340 and, correspondingly, to a variation of impedances at different regions of layer 340. In the example embodiment shown, cap layer 334 is relatively thick in a region between contacts 333a, 333b, as compared to a thickness of cap layer 334 in another region between contacts 333b, 333c. In one such embodiment, the variation of particle concentration (e.g., including thickness variation) along a horizontal range of cap layer 334 results in a relatively high impedance between contacts 333b, 333c, as compared to a level of impedance between contacts 333a, 333b.

In the cross-section that is shown, cap layer 334 is not necessarily of a consistent material composition across one or more regions. For example, it is to be appreciated that, in some embodiments, a conductive path between contacts 332b, 332c is prevented by one or more gaps formed by cap layer 334 and/or by the location of one more dielectric particles of cap layer 334. By contrast, any gaps and/or dielectric particles in cap layer 334 fail to prevent the formation of a conductive path between contacts 332a, 332b (for example).

In some embodiments, process parameters and spray pattern design is controlled to further promote a high entropy of impedance characteristics (which contributes to a high performance PUF)—e.g., where spray 322 comprises a mix of electrically conductive particles and non-conductive particles. In one example embodiment, the sizes of particles of spray 322 are in a range between 1 micron (µm) and 100 µm—e.g., wherein an average of the thickness (z-axis dimension) of cap layer 334 is in a range between 10 µm and 300 µm. In one such embodiment, a roughness of cap layer 134 is in a range between 1 µm and 100 µm. However, such example process parameters are merely illustrative, and are different in various embodiments according to implementation-specific details.

The cross-sectional view of stage 304 in FIG. 3E shows a dielectric material 340 that is spun, laminated or otherwise deposited over cap layer 334, where dielectric material 340 is to provide electrical isolation between cap layer 334 and a metallization layer 350 that is subsequently formed thereon. In some embodiments, a shield structure 352 of metallization layer 350 comprises a contiguous sheet of metallization that, for example, has an area at least equal to that of the array of conductive contacts. In one such embodiment, shield structure 352 obstructs the ability to analyze structural characteristics of cap layer 334 by X-ray (or other) techniques—e.g., wherein shield structure 352 comprises tungsten and/or any of various other suitable metals. Some embodiments additionally or alternatively provide such a shield structure under dielectric layer 311—e.g., where only one patterned metallization layer (not shown) is between such a shield structure and dielectric layer 311. In one such embodiments, via structures, variously located around the array, couple two such shield structures (one above cap layer 334, and the other below cap layer 334) to each other to form a contiguous shielding "cage" structure which frustrates analysis of cap layer 334 and/or other PUF circuit structures.

Figure 4A:
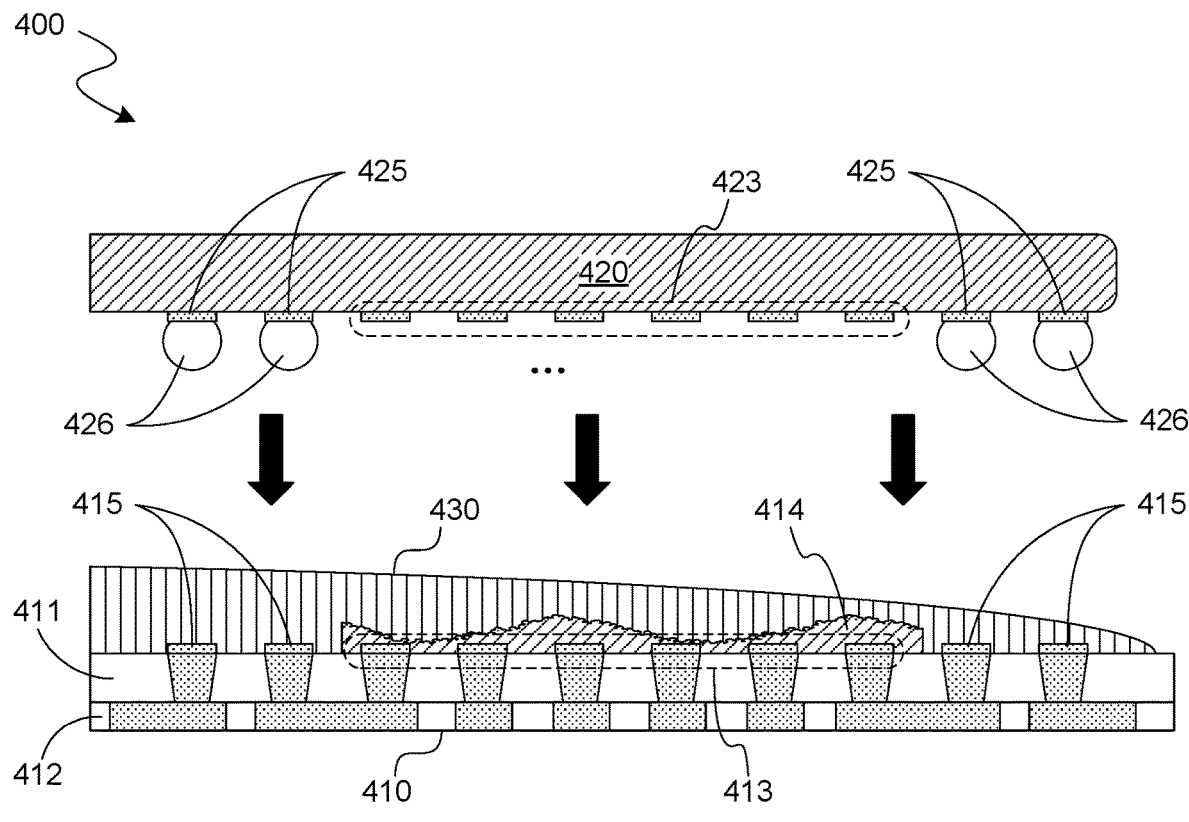
FIG. 4A, 4B illustrates cross-sectional side view diagrams each showing features of a respective stage of processing to provide a packaged device comprising a PUF circuit according to an embodiment.
Figure 4B:
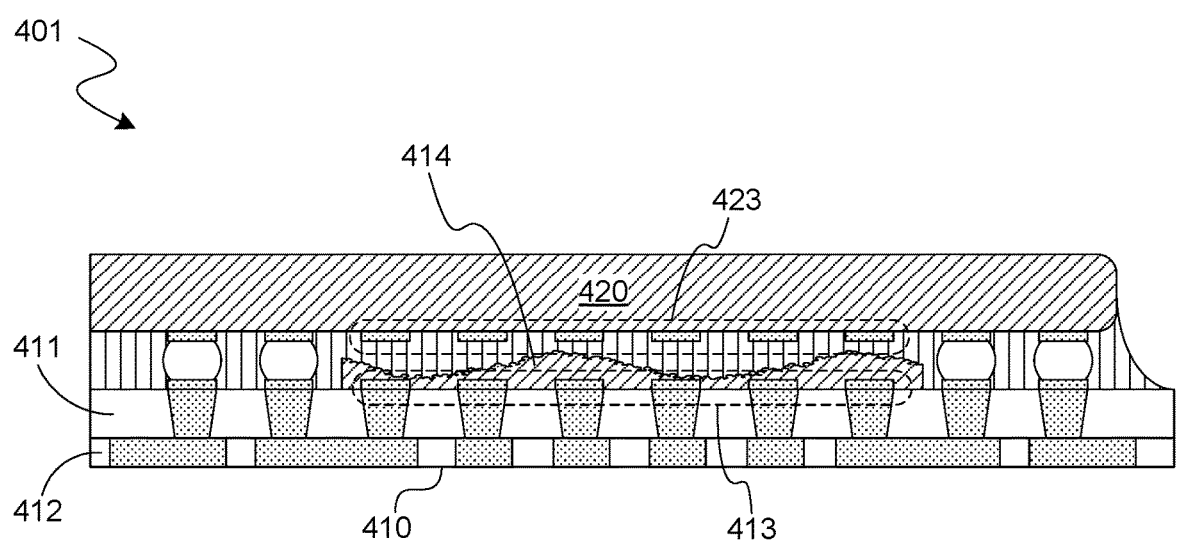

FIGS. 4A, 4B shows stages 400, 401 of processing to provide a packaged device with a PUF circuit according to an embodiment. Processing such as that illustrated by stages 400, 401 performs some or all of method 200, for example. In various embodiments, such processing provides structural features of system 100.

As shown in FIG. 4, stage 400 includes one or more IC chips (including the illustrative IC chip 420 shown) being aligned for attachment with a substrate 410 that, for example, includes features of substrate 110. A first hardware interface of substrate 410—which facilitates coupling with a second hardware interface of IC chip 420—comprises conductive contacts 415 and a first array 413 of other conductive contacts—e.g., wherein array 413 provides functionality of array 113. Conductive traces in a metallization layer 412 of substrate 410 facilitate coupling of one or more of contacts 415 each with a respective contact of array 413. In one such embodiment, the contacts of array 413 are variously electrically coupled each with a different respective contact of the first hardware interface. A dielectric layer 411 of substrate 410 provides electrical insulation between vias which variously extend between array 413 and respective traces formed in metallization layer 412.

The second hardware interface of IC chip 420 comprises conductive contacts 425 and a second array 423 of other conductive contacts. In one such embodiment, integrated circuitry of IC chip 420 is variously coupled between the contacts of array 413 and various ones of contacts 415. The circuitry provides functionality to detect an impedance between two conductive contacts, and to generate a pseudorandom number based on said impedance. To promote randomization in the various levels of such impedances, some embodiments further provide a cap layer 414 over array 113—e.g., wherein cap layer 414 corresponds functionally to one of cap layers 114, 174.

At stage 400, solder bumps 426 are disposed each at a respective one of contacts 425, which are then aligned each with a respective one contacts 415. An underfill material 430 is deposited over contacts 415, cap layer 414, and array 413 to facilitate coupling of substrate 410 with IC chip 420.

At stage 401, solder bumps 426 are brought into contact with contacts 415, and a reflow process is performed to attach IC chip 420 to substrate 410. Attachment of IC chip 420 with substrate 410 provides PUF circuit structures comprising arrays 413, 423, and cap layer 414—e.g., wherein the varying thickness of cap layer 414 (and, correspondingly, the varying thicknesses of underfill material 430) provides different capacitances each between a respective contact of array 413 and a respective contact of array 423.

FIGS. 5A-5D show respective stages 500-503 of processing to fabricate a substrate comprising a PUF circuit according to an embodiment. Processing such as that illustrated by stages 500-503 provides structures of one of substrates 110, 160, 170, 410 (for example)—e.g., where such processing includes some or all of method 200.

At stage 500, metallization structures are variously formed under and in a dielectric layer 510 which (for example) corresponds functionally to one of dielectric layers 131, 161, 171, 311, 411. Such metallization structures extend to form conductive contacts 512 in a level of metallization which is at a side 511 of dielectric layer 510. In the example embodiment shown, a first array of first ones of contacts 512 is within a region 520 of side 511, wherein a second array of second ones of contacts 512 is within another region 522 of side 511. In one such embodiment, metallization structures (not shown) extend in and under side 511 to variously couple the first ones of contacts 512 and the second ones of contacts 512 to third ones of contacts 512 (where said third ones are outside of regions 520, 522). Such metallization structures facilitate electrically coupling of the first and second ones of contacts 512, via the third ones of contacts 512, to a hardware interface by which the substrate is to be coupled to an IC chip (such as IC chip 120).

To enable PUF features with contacts 512, some embodiments form respective portions of a cap layer (such as one of cap layers 114, 134, 174, 334, 414) over regions 520, 522. For example, at stage 501, a hard mask 530 is deposited over 511 and patterned to form holes 532, 534 that expose regions 520, 522 (respectively). Formation of the patterned hard mask 530 includes one or more operations which, for example, are adapted from conventional circuit fabrication techniques. Subsequently, at stage 502, a cap material 540 is cold sprayed or otherwise deposited by an HTAM process into holes 532, 534. After such deposition, portions of cap material 540 which are outside of regions 532, 534 are selectively etched or otherwise removed (at stage 503), exposing the third ones of contacts 512. Such selective removal results in the formation of a cap layer, portions 550, 552 of which are over regions 520, 522 (respectively). In one such embodiment, a patterned deposition of a dielectric material (not shown) onto portions 550, 552 is performed prior to the selective removal of other portions of cap material 540—e.g., where the dielectric material protects portions 550, 552 from such removal. In some embodiments, the use of hard mask 530 with HTAM processing provides for a variation of cap layer structures to promote entropy in PUF circuit operations.

Figure 6:
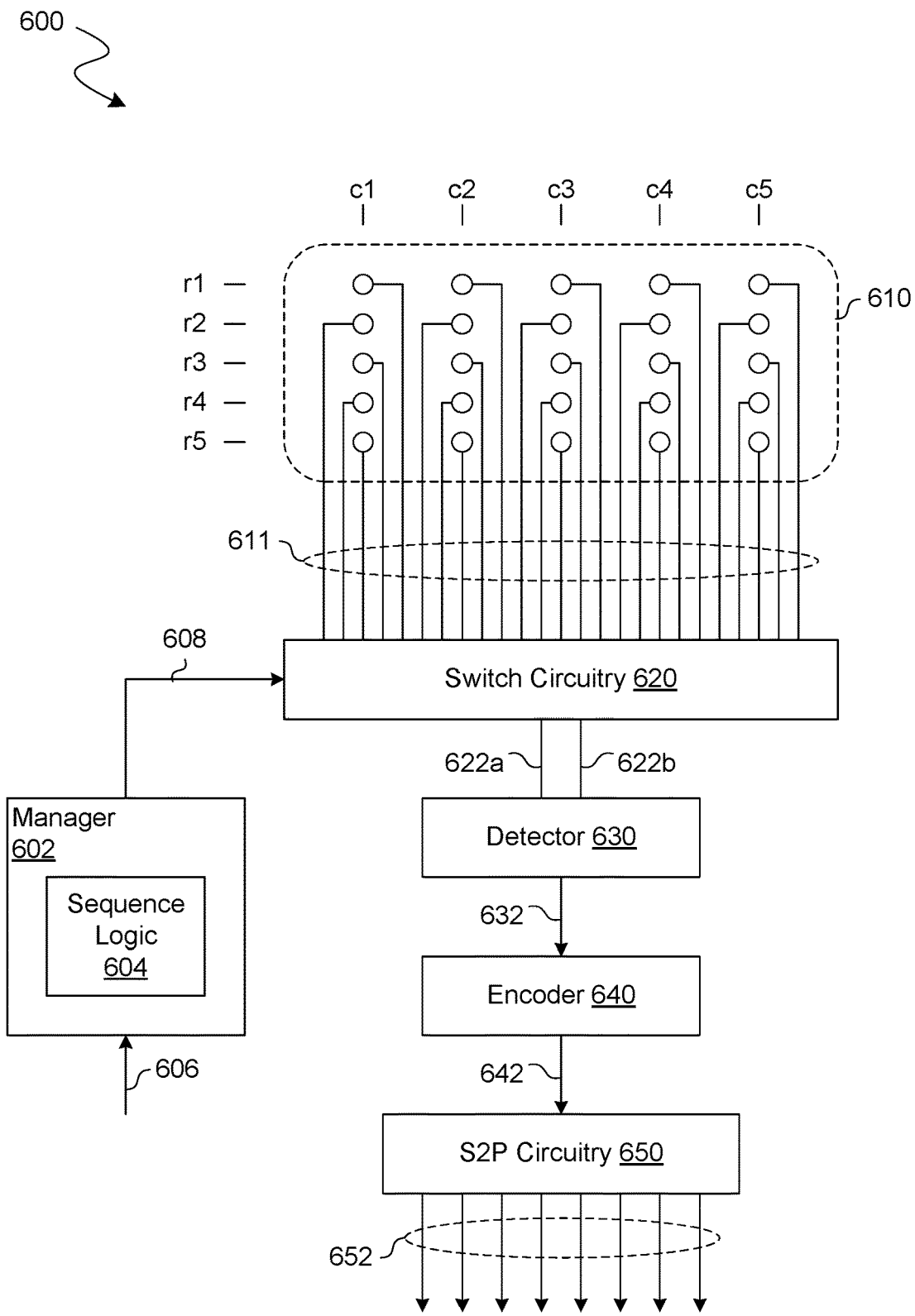
FIG. 6 illustrates a functional block diagram showing features of an integrated circuit to generate security information with a PUF circuit according to an embodiment.

FIG. 6 shows features of a system 600 to generate security information based on an output from one or more PUF circuits according to an embodiment. In various embodiments, system 600 includes or is to couple to PUF circuit structures such as those provided by one of substrates 110, 160, 170, 410. For example, circuitry of system 600 is provided at one of IC chips 120, 420 (for example)—e.g., wherein such circuitry is to perform some or all of operations 202.

As shown in FIG. 6, system 600 includes conductive contacts 610 of a hardware interface by which integrated circuitry of system 600 are to be couple to an IC package substrate (not shown). The integrated circuitry of system 600 includes (for example), switch circuitry 620, a detector 630, an encoder 640, and serial-to-parallel (S2P) circuitry 650. Contacts 610 are variously coupled to switch circuitry 620 each via a different respective one of signal lines 611. In one such embodiment, contacts 610 are arranged in an array comprising rows r1-r5 and columns c1-c5. However, the particular number and relative arrangement of contacts 610 is merely illustrative, and not limiting on some embodiments.

Operation of the integrated circuitry is managed by hardware logic and/or executing software logic (represented as the illustrative manager 602 shown) which, in an embodiment, is coupled to receive a signal 606 that requests a cryptographic key, an authentication code and/or any of various other types of security information. Signal 606 is received from any of a variety of agents that are external to (or alternatively, internal to) system 600. Some embodiments are not limited with respect to a particular source of signal 606 and/or a particular mechanism by which signal 606 is communicated to manager 602.

Switch circuitry 620 represents any of a variety of multiplexers, crossover switches and/or other circuitry which is suitable to switchedly couple a selected two or more of contacts 610 each with a different respective output of switch circuitry 620. For example, to service the request indicated by signal 606, manager 602 operates switch circuitry 620 with a control signal 608 to couple a selected two of signal lines 611 each with a different respective one of output signal lines 622a, 622b. In one such embodiment, manager 602 includes, is coupled to access, or otherwise operates based on, sequence logic 604 which determines a particular sequence according to which different respective pairs of contacts 610 are to be successively coupled to signal lines 622a, 622b.

Where switch circuitry 620 couples a particular two of signal lines 611 to signal lines 622a, 622b, detector 630 is thereby coupled to communicate a signal which indicates an impedance between a corresponding two of contacts 610. Such an impedance is due at least in part to a cap layer structure such as one of cap layers 114, 134, 174, 334, 414 (for example). Based on such a signal, detector 630 detects said impedance, and generates a signal 632 comprising one or more data bits which represent a level of the impedance.

Encoder 640 is coupled to receive from detector 630 a signal 632 indicating one or more impedance levels, and further to perform a concatenation or other encoding which generates a pseudo-random number based on signal 632. In one example embodiment, encoder 640 represents the pseudo-random number by communicating a data sequence 642—e.g., wherein the number is based on an order in which different impedances are successively communicated by signal 632 to encoder 640. Although some embodiments are not limited in this regard, system 600 further comprises S2P circuitry 650 to perform serial-to-parallel processing which results in a representation of data sequence 642 as a parallel signal output 652.

Figure 7:
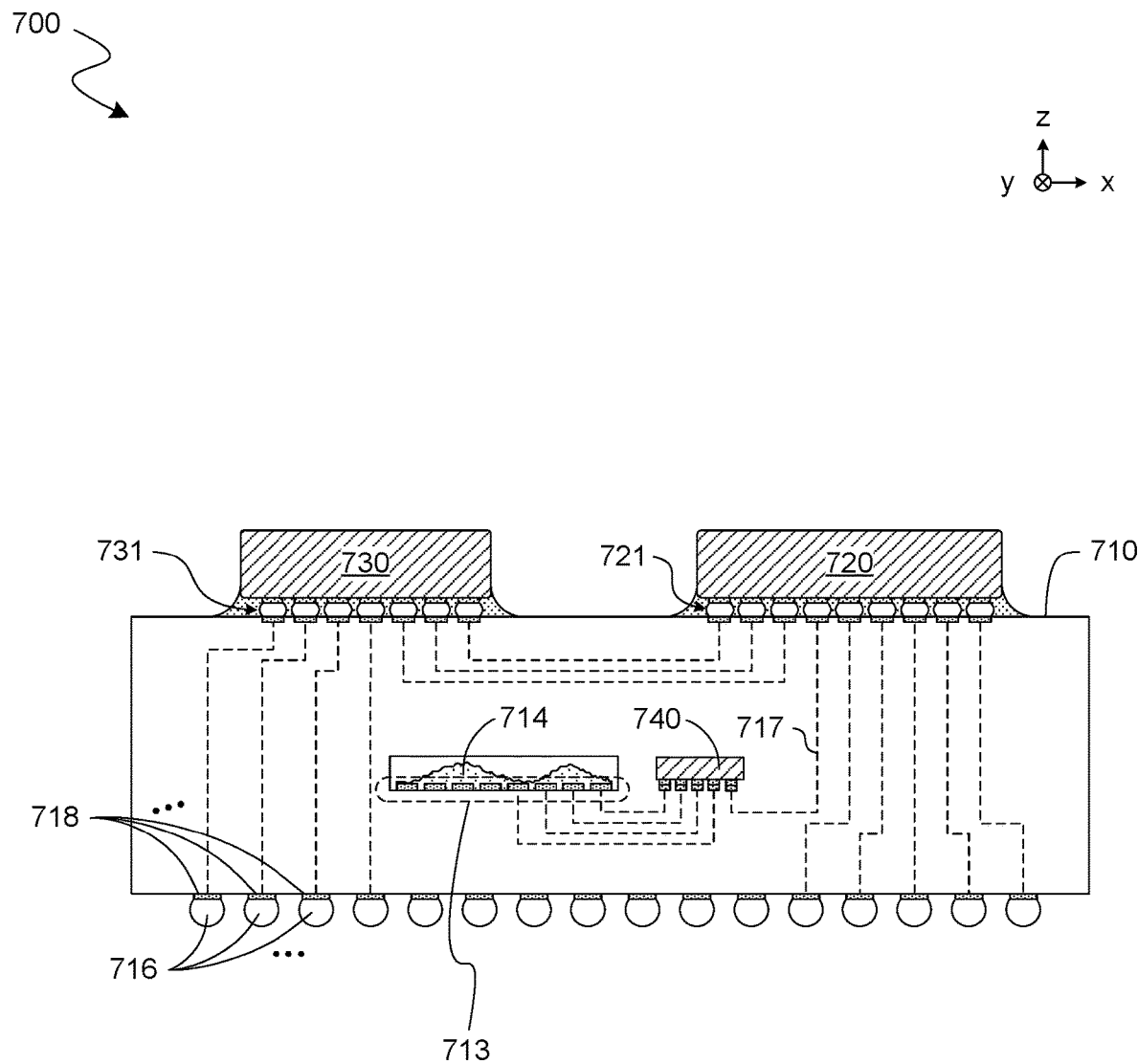
FIG. 7 illustrates a cross-sectional side view diagram showing features of a packaged device comprising PUF circuitry according to an embodiment.

FIG. 7 shows features of a system 700 to provide PUF circuit functionality with a package substrate according to an embodiment. System 700 illustrates one embodiment wherein an organic substrate comprises PUF circuit structures and an embedded IC chip coupled thereto, where the IC chip is operable to generate security information based on one or more impedances of the PUF circuit structures. System 700 includes features of system 100, for example, and/or provides functionality to perform some or all of operations 202.

As shown in FIG. 7, system 700 comprises a substrate 710 and IC chips 720, 730 variously coupled thereto. For example, a first hardware interface of substrate 710 is coupled to IC chip 720 via solder bumps 721, and a second hardware interface of substrate 710 is coupled to IC chip 730 via solder bumps 731. Moreover, a third hardware interface of substrate 710 (the third hardware interface comprising conductive pads 718) facilitates coupling of system 700 to a printed circuit board—e.g., via the illustrative solder balls 716 shown.

To facilitate an implementation of PUF features according to various embodiments, substrate 710 further comprises an array 713 of conductive contacts, and a cap layer 714 which extends over array 713—e.g., where array 713 and cap layer 714 correspond functionally to array 113 and cap layer 114 (respectively). Contacts of array 713 are variously coupled each to a different respective contact of a semiconductor chiplet 740 that is embedded in substrate 710—e.g., wherein one or more metallization layers and one or more dielectric layers of substrate 710 extend between chiplet 740 and the first and second hardware interfaces. In various embodiments, deposition of chiplet 740 in substrate 710 is performed with one or more operations which (for example) are adapted from conventional embedded die packaging techniques.

Integrated circuitry of chiplet 740 provides functionality (such as that of system 600) to repeatedly determine a same pseudo-random number based on one or more impedances that are provided with cap layer 714. In one such embodiment, the pseudo-random number is determined on behalf of circuit resources (external to substrate 710) that need to identify security information that is based on the pseudo-random number. By way of illustration and not limitation, substrate 710 further comprises one or more interconnects (e.g., including the illustrative interconnect 717 shown) which are coupled to enable communications between chiplet 740 and one or both of IC chips 720, 730. Communications via said one or more interconnects enable an IC chip to request from chiplet 740 a pseudo-random number or (for example) a cryptographic key, an authentication code or other such security information that is based on such a pseudo-random number.

Figure 8:
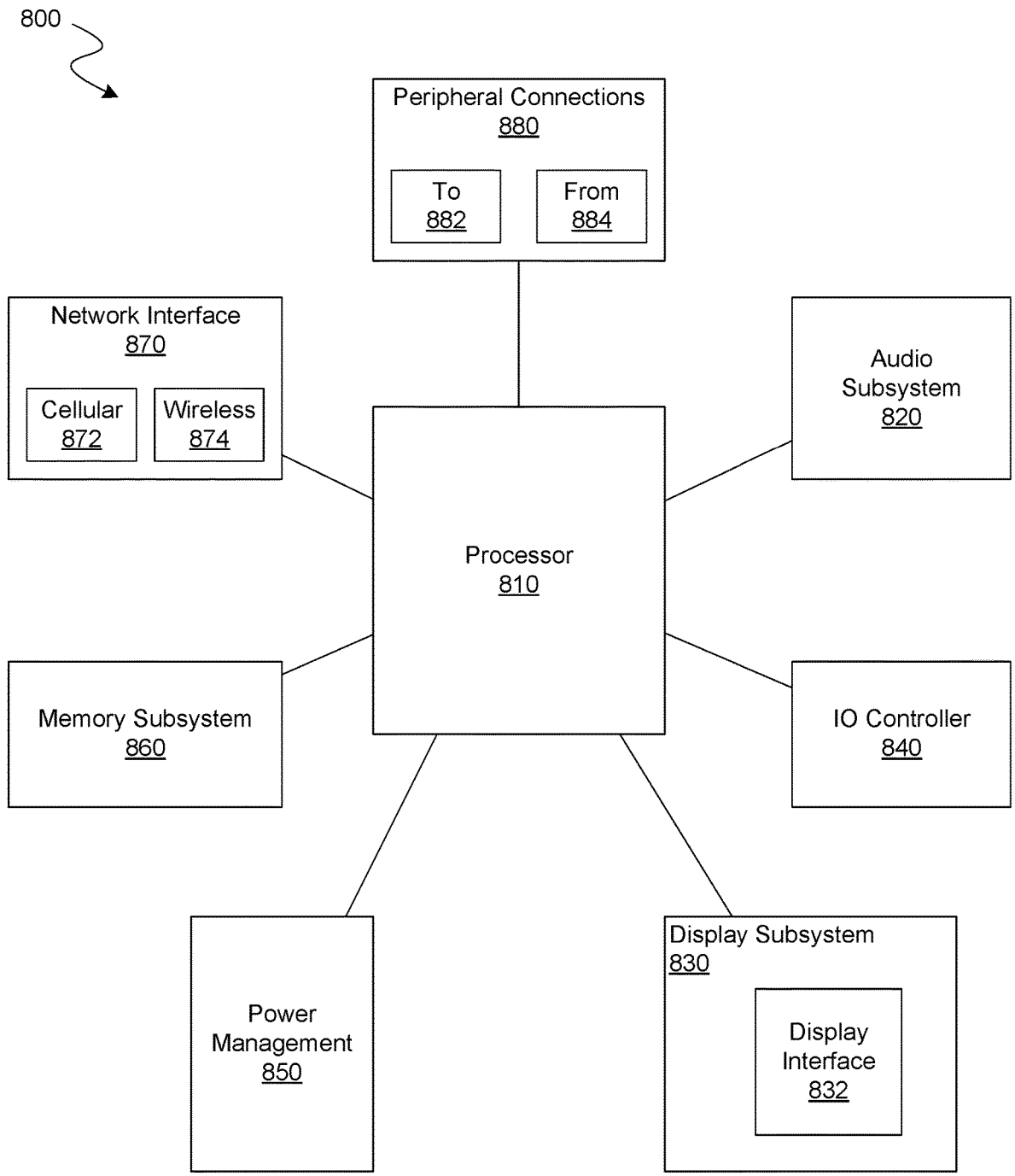
FIG. 8 illustrates a functional block diagram showing features of a computing device according to an embodiment.

FIG. 8 illustrates a block diagram of an embodiment of a computing device 800 according to an embodiment. In some embodiments, computing device 800 represents a mobile computing device, such as a computing tablet, a mobile phone or smart-phone, a wireless-enabled e-reader, or other wireless mobile device. It will be understood that certain components are shown generally, and not all components of such a device are shown in computing device 800.

In some embodiments, computing device 800 includes a first processor 810. The various embodiments of the present disclosure may also comprise a network interface within 870 such as a wireless interface so that a system embodiment may be incorporated into a wireless device, for example, cell phone or personal digital assistant.

According to some embodiments, processor 810 represents a CPU or a GPU, and can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting the computing device 800 to another device. The processing operations may also include operations related to audio I/O and/or display I/O.

In one embodiment, computing device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 800, or connected to the computing device 800. In one embodiment, a user interacts with the computing device 800 by providing audio commands that are received and processed by processor 810.

Display subsystem 830 represents hardware (e.g., display devices) and software (e.g., drivers) components that provide a visual and/or tactile display for a user to interact with the computing device 800. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touch screen (or touch pad) device that provides both output and input to a user.

I/O controller 840 represents hardware devices and software components related to interaction with a user. I/O controller 840 is operable to manage hardware that is part of audio subsystem 820 and/or display subsystem 830. Additionally, I/O controller 840 illustrates a connection point for additional devices that connect to computing device 800 through which a user might interact with the system. For example, devices that can be attached to the computing device 800 might include microphone devices, speaker or stereo systems, video systems or other display devices, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of the computing device 800. Additionally, audio output can be provided instead of, or in addition to display output. In another example, if display subsystem 830 includes a touch screen, the display device also acts as an input device, which can be at least partially managed by I/O controller 840. There can also be additional buttons or switches on the computing device 800 to provide I/O functions managed by I/O controller 840.

In one embodiment, I/O controller 840 manages devices such as accelerometers, cameras, light sensors or other environmental sensors, or other hardware that can be included in the computing device 800. The input can be part of direct user interaction, as well as providing environmental input to the system to influence its operations (such as filtering for noise, adjusting displays for brightness detection, applying a flash for a camera, or other features).

In one embodiment, computing device 800 includes power management 850 that manages battery power usage, charging of the battery, and features related to power saving operation. Memory subsystem 860 includes memory devices for storing information in computing device 800. Memory can include nonvolatile (state does not change if power to the memory device is interrupted) and/or volatile (state is indeterminate if power to the memory device is interrupted) memory devices. Memory subsystem 860 can store application data, user data, music, photos, documents, or other data, as well as system data (whether long-term or temporary) related to the execution of the applications and functions of the computing device 800.

Elements of embodiments are also provided as a machine-readable medium (e.g., memory 860) for storing the computer-executable instructions (e.g., instructions to implement any other processes discussed herein). The machine-readable medium (e.g., memory 860) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity via network interface 870 includes hardware devices (e.g., wireless and/or wired connectors and communication hardware) and software components (e.g., drivers, protocol stacks) to enable the computing device 800 to communicate with external devices. The computing device 800 could be separate devices, such as other computing devices, wireless access points or base stations, as well as peripherals such as headsets, printers, or other devices.

Network interface 870 can include multiple different types of connectivity. To generalize, the computing device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 874 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 880 include hardware interfaces and connectors, as well as software components (e.g., drivers, protocol stacks) to make peripheral connections. It will be understood that the computing device 800 could both be a peripheral device ("to" 882) to other computing devices, as well as have peripheral devices ("from" 884) connected to it. The computing device 800 commonly has a "docking" connector to connect to other computing devices for purposes such as managing (e.g., downloading and/or uploading, changing, synchronizing) content on computing device 800. Additionally, a docking connector can allow computing device 800 to connect to certain peripherals that allow the computing device 800 to control content output, for example, to audiovisual or other systems.

In addition to a proprietary docking connector or other proprietary connection hardware, the computing device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In the description herein, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for providing physically unclonable function circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) package substrate comprising:
    an insulator layer;
    a physical unclonable function (PUF) structure, the PUF structure comprising:
        a level of metallization comprising an array of electrodes at a side of the insulator layer; and
        a cap layer over the array, the cap layer in contact with individual ones of the electrodes and in contact with at least a portion of the insulator layer between adjacent ones of the electrodes, wherein the cap layer comprises a material having a different composition or microstructure than the metallization, wherein the material is a first material which forms first microstructures of the cap layer, wherein second microstructures formed by the cap layer are each located between respective ones of the first microstructures, wherein the second microstructures each comprise a respective void or a second material other than the first material; and
    a dielectric material over the PUF structure.

2. The IC package substrate of claim 1, wherein the cap layer comprises discrete particles of an electrically conductive material, and wherein a first of the particles is in contact with, and extends beyond an edge of, a first of adjacent ones of the electrodes, and a second of the particles is in contact with, and extends beyond an edge of, a second of the adjacent ones of the electrodes.

3. The IC package substrate of claim 2, wherein the first of the particles is not in contact with the second of the adjacent ones of the electrodes.

4. The IC package substrate of claim 2, wherein the first of the particles and the second of the particles each have a respective size which is less than a spacing between two adjacent ones of the electrodes.

5. The IC package substrate of claim 1, wherein the insulator layer is at an exterior side of the IC package substrate.

6. The IC package substrate of claim 1, wherein the level of metallization is a first level of metallization and the array is a first array of first electrodes, and wherein the PUF structure further comprises a second level of metallization over the first level of metallization, wherein the second level of metallization comprises a second array of second electrodes, and wherein the second array overlaps the first array and wherein the cap layer is between the first and second electrodes.

7. The IC package substrate of claim 1, further comprising a second level of metallization over or under the first level of metallization, the second level comprising a contiguous sheet of metallization having an area at least equal to that of the array.

8. The IC package substrate of claim 1, wherein metallization structures of the IC package substrate extend to a first portion of the side of the insulator layer, wherein the first portion is outside of a horizontal span of the cap layer.

9. The IC package substrate of claim 1, wherein, relative to the metallization or the dielectric material, the cap layer has a least one of, a greater surface roughness, or a greater % voiding area.

10. The IC package substrate of claim 1, further comprising an embedded IC chip coupled to the array, the IC chip comprising circuitry to:
    receive a signal from one of a first electrode of the array or a second electrode;
    based on the signal, detect an impedance between the first electrode and the second electrode; and
    generate a pseudo-random number based on the impedance.

11. One or more non-transitory computer-readable storage media having stored thereon instructions which, when executed by one or more processing units, cause the one or more processing units to perform a method comprising:
    receiving a signal from one of a first electrode or a second electrode, wherein a physical unclonable function (PUF) structure of an integrated circuit (IC) package substrate comprises:
        a level of metallization comprising an array of electrodes at a side of an insulator layer of the IC package substrate, wherein the array of electrodes comprises the first electrode; and
        a cap layer over the array, the cap layer in contact with individual ones of the electrodes and in contact with at least a portion of the insulator layer between adjacent ones of the electrodes, wherein the cap layer comprises a material having a different composition or microstructure than the metallization;
    based on the signal, detecting an impedance between the first electrode and the second electrode; and
    generating a pseudo-random number based on the impedance.

12. The one or more computer-readable storage media of claim 11, wherein the cap layer comprises discrete particles of an electrically conductive material, and wherein a first of the particles is in contact with, and extends beyond an edge of, a first of adjacent ones of the electrodes, and a second of the particles is in contact with, and extends beyond an edge of, a second of the adjacent ones of the electrodes.

13. The one or more computer-readable storage media of claim 11, wherein the insulator layer is at an exterior side of the IC package substrate.

14. The one or more computer-readable storage media of claim 11, wherein the level of metallization is a first level of metallization and the array is a first array of first electrodes, and wherein the PUF structure further comprises a second level of metallization over the first level of metallization.

15. A system comprising:
    a packaged device comprising:
        an integrated circuit (IC) chip;
        a substrate coupled to the IC chip, the substrate comprising:
            an insulator layer;
            a physical unclonable function (PUF) structure, the PUF structure comprising:
                a level of metallization comprising an array of electrodes at a side of the insulator layer; and a cap layer over the array, the cap layer in contact with individual ones of the electrodes and in contact with at least a portion of the insulator layer between adjacent ones of the electrodes, wherein the cap layer comprises a material having a different composition or microstructure than the metallization, wherein the material is a first material which forms first microstructures of the cap layer, wherein second microstructures formed by the cap layer are each located between respective ones of the first microstructures, wherein the second microstructures each comprise a respective void or a second material other than the first material; and a dielectric material over the PUF structure; and a display device coupled to the packaged device, the display device to display an image based on a signal communicated with the IC chip.

16. The system of claim 15, wherein the cap layer comprises discrete particles of an electrically conductive material, and wherein a first of the particles is in contact with, and extends beyond an edge of, a first of adjacent ones of the electrodes, and a second of the particles is in contact with, and extends beyond an edge of, a second of the adjacent ones of the electrodes.

17. The system of claim 15, wherein the level of metallization is a first level of metallization and the array is a first array of first electrodes, and wherein the PUF structure further comprises a second level of metallization over the first level of metallization, wherein the second level of metallization comprises a second array of second electrodes, and wherein the second array overlaps the first array and wherein the cap layer is between the first and second electrodes.

18. The system of claim 15, the substrate further comprising a second level of metallization over or under the first level of metallization, the second level comprising a contiguous sheet of metallization having an area at least equal to that of the array.

19. The system of claim 15, the substrate further comprising a second IC chip coupled to the array, the second IC chip comprising circuitry to:
receive a signal from one of a first electrode of the array or a second electrode;
based on the signal, detect an impedance between the first electrode and the second electrode; and
generate a pseudo-random number based on the impedance.

* * * * *